Figure 3:
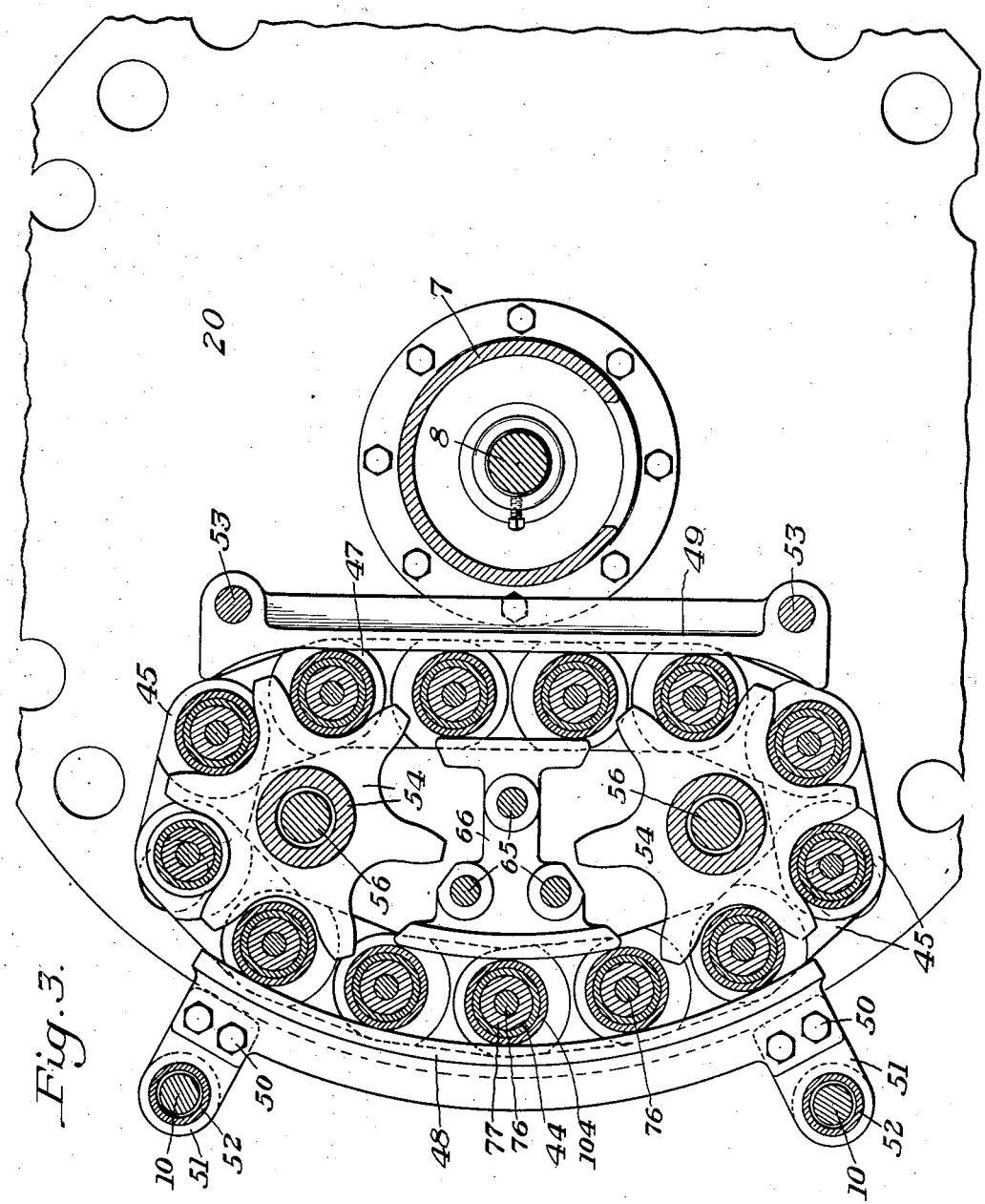

Nov. 22, 1932.  E. E. SLICK  1,888,396
GLASS WORKING MACHINE
Filed May 1, 1928   5 Sheets-Sheet 1
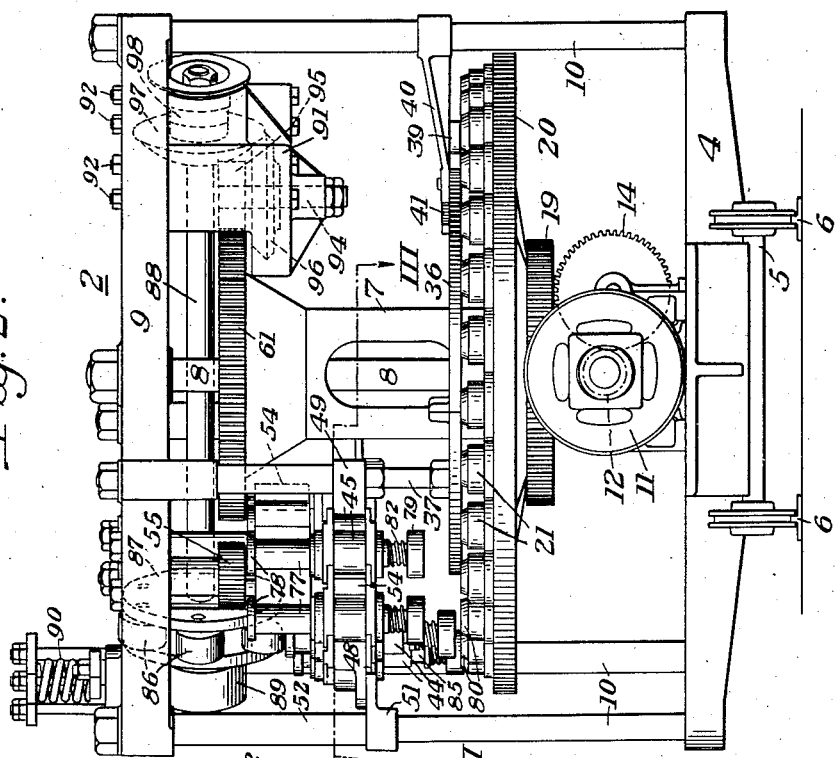
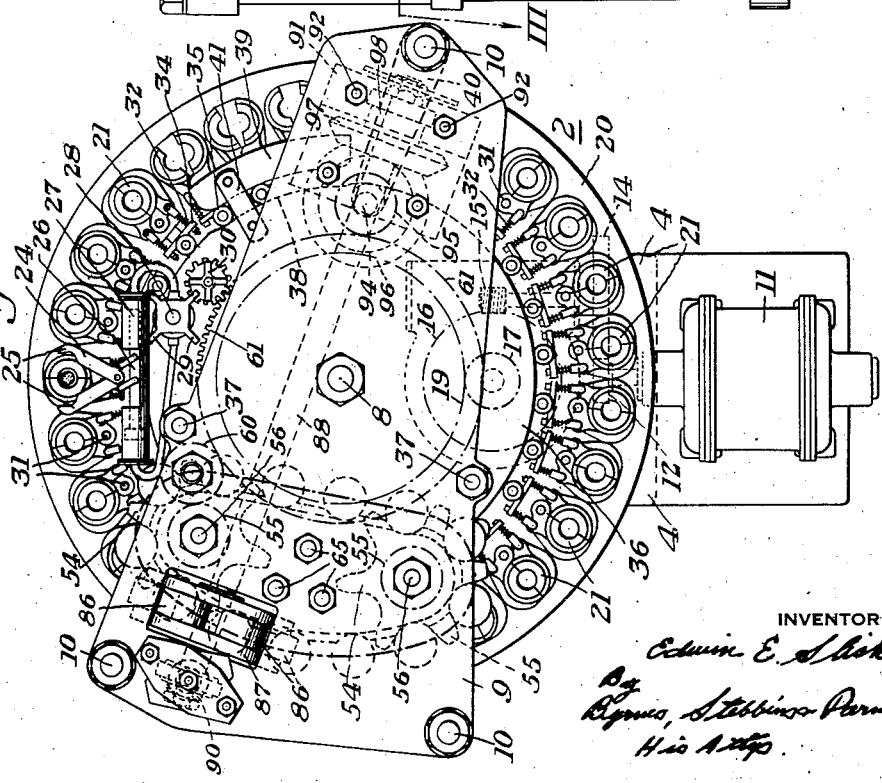
INVENTOR Nov. 22, 1932.   E. E. SLICK   1,888,396
GLASS WORKING MACHINE
Filed May 1, 1928    5 Sheets-Sheet 2

INVENTOR
Edwin E. Slick
By Byrnes, Stebbins & Parmelee
His Attys

Nov. 22, 1932.   E. E. SLICK   1,888,396
GLASS WORKING MACHINE
Filed May 1, 1928   5 Sheets-Sheet 3

INVENTOR
Edwin E. Slick
By Byrnes, Stebbins & Parmelee
His Attys.

Nov. 22, 1932.  E. E. SLICK  1,888,396
GLASS WORKING MACHINE
Filed May 1, 1928  5 Sheets-Sheet 4

INVENTOR
Edwin E. Slick
By Byrnes, Stebbins & Parmelee
His Attys

Nov. 22, 1932.  E. E. SLICK  1,888,396
GLASS WORKING MACHINE
Filed May 1, 1928  5 Sheets-Sheet 5

INVENTOR
Edwin E. Slick
By Byrnes, Stebbins & Parmelee
His Attys.

Patented Nov. 22, 1932

1,888,396

UNITED STATES PATENT OFFICE

EDWIN E. SLICK, OF PITTSBURGH, PENNSYLVANIA

GLASS WORKING MACHINE

Application filed May 1, 1928. Serial No. 274,244.

The present invention relates broadly to the art of glass working, and more particularly to apparatus adapted to operate upon successive gathers or charges of glass to effect a shaping thereof.

Certain features of the invention are useful in connection with the handling of materials other than glass, and it will therefore be understood that if desired the apparatus may be used with such materials. Certain of the features of the present invention are improvements over the glass working apparatus shown and described in my copending application Serial No. 177,919, filed March 24, 1927.

It is customary in the art to which the present invention relates to provide glass working apparatus comprising a relatively movable carrier for receptacles such as molds, and carriers for shaping elements cooperating with the molds for effecting a shaping operation. The molds and shaping elements are brought into operative relation for effecting the shaping operation in rapid succession.

In my copending application, the molds are carried by a rotating support and the shaping elements are carried by another support mounted for rotation about a different axis. The carrier for the shaping elements is of considerably less diameter than is the diameter of the carrier for the molds. Means are provided for bringing the shaping elements into the path of travel of the molds and for keeping the shaping elements in engagement with the molds long enough to form a molded article.

In the present invention, the number of parts in the second carrier and its actuating mechanism has been materially reduced and simplified by making the carrier in the form of a chain. The shaping elements are supported by the pintles of the chain. The successive shaping elements are pressed through the pintles by small rollers carried around the circumference of a hub mounted on a floating shaft. The floating shaft is resiliently mounted in order that differences in the thickness of the material in the mold are compensated for by movement of the shaft and shaping elements. The carrier chain, constituted as heretofore described, is driven by the teeth of sprocket wheels engaging between the several pintles.

Figure 4:
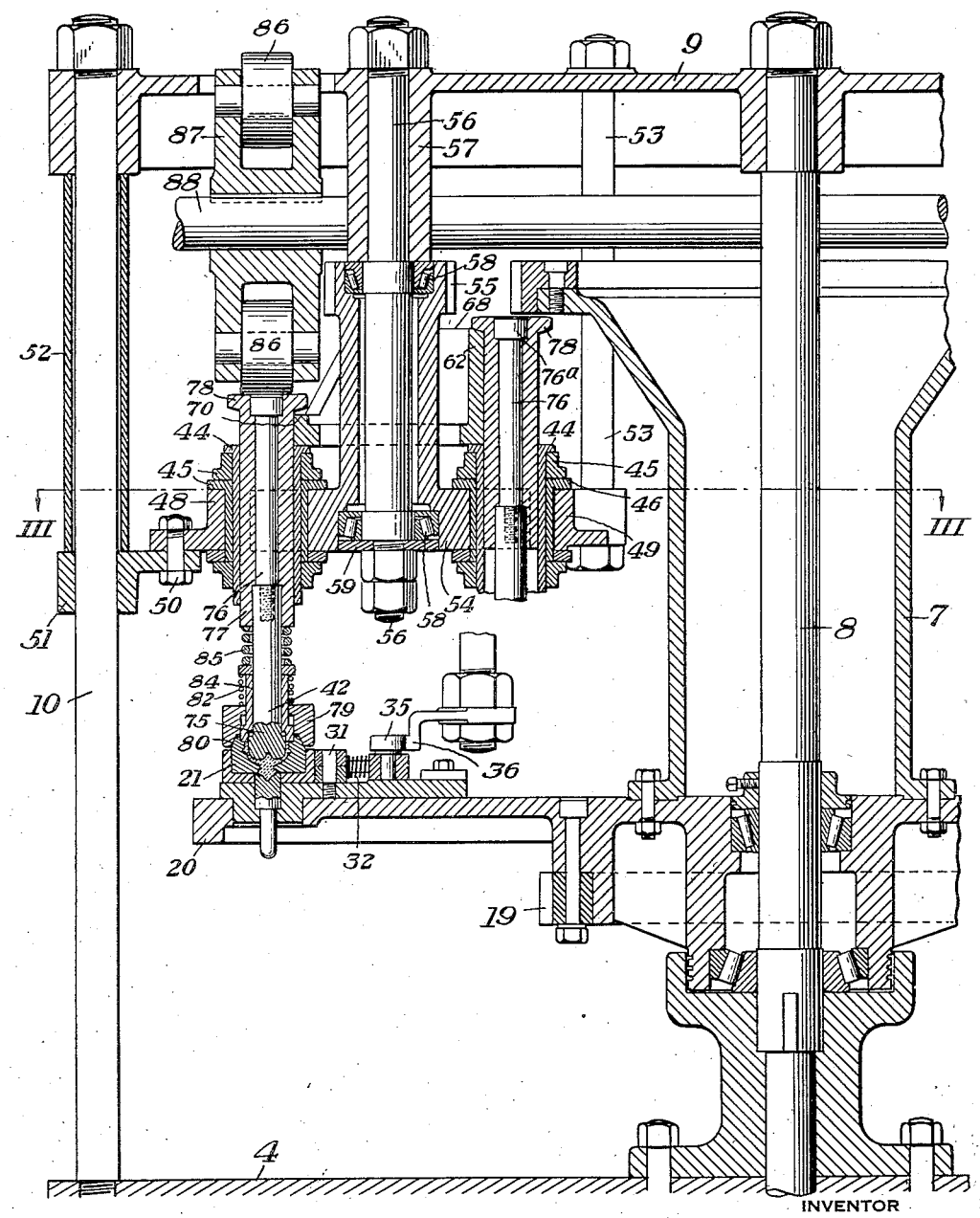
Figure 5:
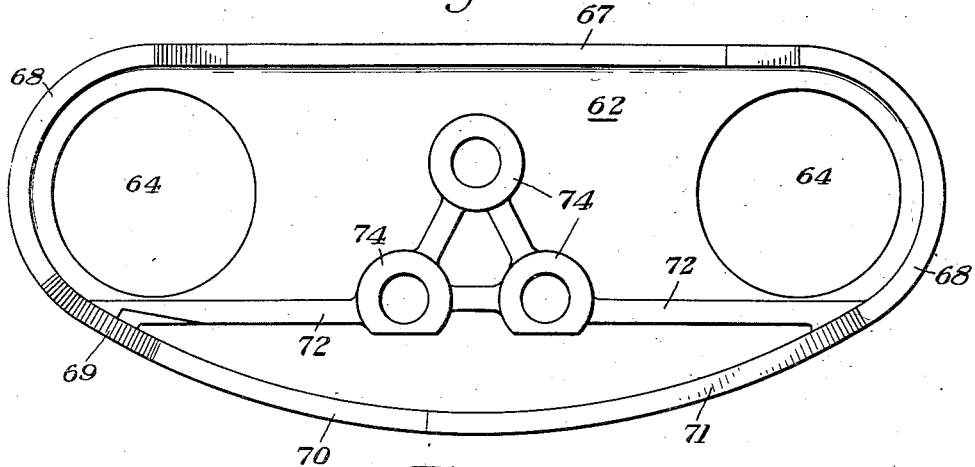
Figure 6:
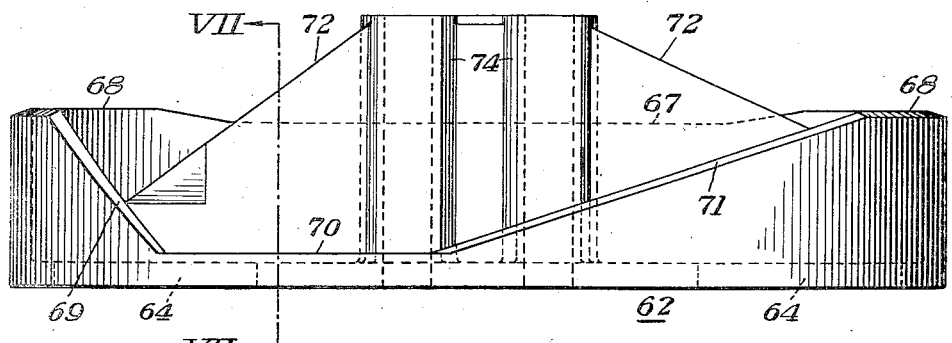
Figure 7:
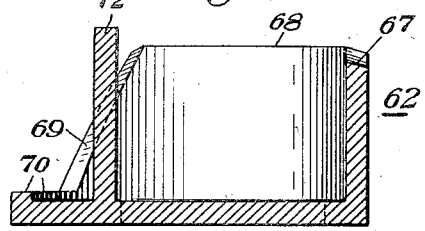
Figure 8:
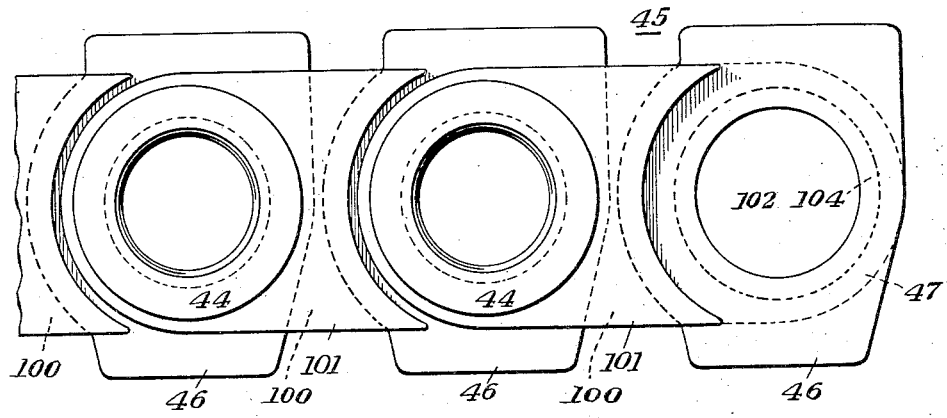
Figure 9:
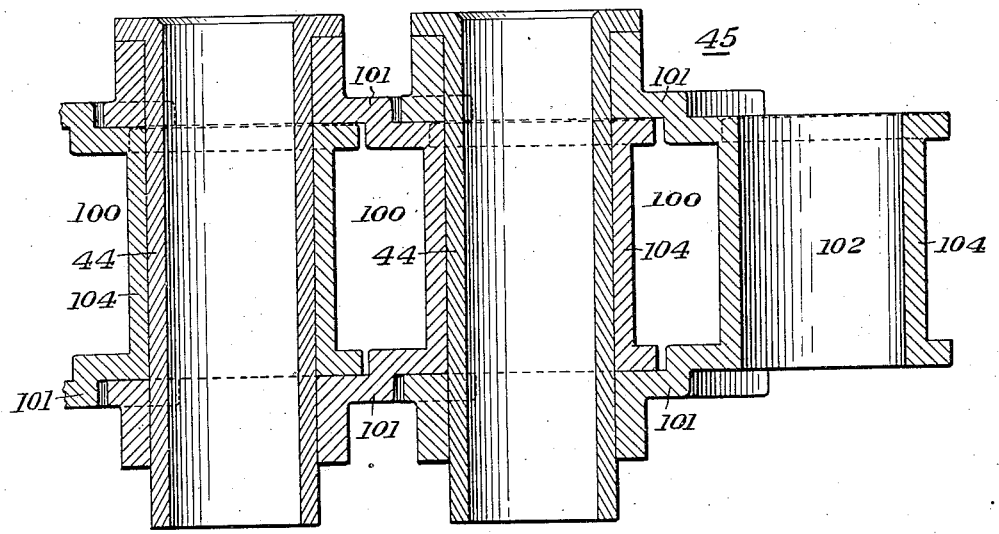

The accompanying drawings illustrate the present preferred embodiment of the invention, in which Figure 1 is a plan view of a glass working machine embodying my invention, Figure 2 is an elevational view thereof, Figure 3 is a plan view taken along the section line III—III of Figure 2, Figure 4 is a diagrammatic vertical sectional view of a portion of the machine, the section being taken along an irregular section line to show the cooperative relation between the different machine elements, Figure 5 is a plan view of a cam track, Figure 6 is a side view thereof, Figure 7 is a sectional view taken along the section line VII—VII of Figure 6, Figure 8 is a plan view of a carrier link, and Figure 9 is a sectional view thereof.

Referring to Figures 1 and 2, there is illustrated a glass working machine 2 comprising a base 4 mounted on trucks 5 for movement along rails 6, although it is to be understood that the machine may be stationary if desired. A turret 7 is mounted at substantially the center of the base 4. A spindle 8 for the turret extends through a plate 9 secured against rotation by clamping and guide rods 10 extending upwardly from the base 4. The turret 7 is rotated by a motor 11 through a train of reducing gearing including intermeshing gears 12 and 14, worm 15, worm wheel 16, and pinion 17, the pinion 17 directly engaging the gear 19 concentric with the turret.

The turret 7 is provided with a supporting carrier 20, in the form of a rotating table, for a plurality of shaping elements 21. The shaping elements are shown in the form of molds, although it is to be understood that the term "shaping elements" is herein used generically as a word of definition including within its scope pressing or blowing means, such as plungers, blow-heads, or the like, and is not used as a term of limitation.

As the support 20 rotates, material, such as molten glass, is supplied thereto in small gathers by a shearing mechanism 24 comprising a pair of pivotally mounted blades 25 actuated through a shearing cycle by the movement of a piston rod 26, the ends of which are housed in a double ended cylinder 27. A four-way valve 28 is provided for alternately applying pressure and exhausting the ends of the cylinder 27 for actuating the blades 25. The stem of the valve 28 is provided with teeth 29 cooperating with a star wheel 30 for rotating the valve 28 through movements of substantially 90° in timed relation to the movement of the turret 7.

The details of the shearing mechanism 24 are shown and described in my co-pending application Serial No. 266,601 filed April 2, 1928.

The shaping elements 21 are shown in the form of split molds, the halves of which are pivotally mounted on pins 31 about which they are urged to closed position by springs 32. Each pair of springs 32 is controlled by a cross-head 34 having a roller 35 mounted thereon for engaging a stationary cam 36 suspended by rods 37 from the plate 9 and by a bracket 40 extending to the rod 10, shown at the right side of Figure 2. Opposite a detent 38 in the cam 36, an arcuate guide plate 39 is mounted by straps 41 extending radially from cam 36. As the successive shaping elements 21 pass between the inner surface of the plate 39 and the outer surface of the detent 38, the rollers 35 move the cross-heads 34 inwardly for separating the halves of the shaping elements. Suitable means (not shown) may be provided for removing the finished articles from the opened shaping elements. Jets of air are suitable for such a purpose.

Referring particularly to Figures 2 and 4, a plurality of cooperating shaping elements 42 extends downwardly through tubes 44 that constitute pintles for a series of telescoping links 45. The several links 45 and tubes 44 constitute an endless conveyor. The endless conveyor so constituted, is supported by upper flanges 46 and lower flanges 47 formed on the links 45, shown in Figures 8 and 9, and embracing edges of an outer guide plate 48 and an inner guide plate 49. The guide plate 48 is secured by bolts 50 to brackets 51 surrounding and secured to the rods 10 and depending from the plate 9. Spacers 52 are interposed between the plate 9 and the brackets 51. The plate 49 is supported by bolts 53 extending downwardly from the plate 9.

Referring to Figures 3 and 4, the endless conveyor is driven by sprocket wheels 54 that mesh with the pintles of the successive links 45. The sprocket wheels 54 are provided with gear teeth 55 at their upper ends, and are suspended by bolts 56 extending downwardly through sleeves 57 in the plate 9. Roller bearings 58 are provided between the ends of the sprocket wheels 54 and the lower ends of the sleeves 57, and washers 59 carried at the lower ends of the bolts 56.

Rotative movement is imparted to the sprocket wheel shown at the top of Figures 1 and 3 by a pinion 60 that meshes with a gear 61 carried by the turret 7. The gear 61 also drives the star wheel 30. As both of the sprocket wheels 54 are made alike and are provided with teeth 55, the positions of the sprocket wheels in the machine may be changed when the teeth 55 on one sprocket wheel become worn. Accordingly, when the turret 7 is rotated, the shaping elements 42 are rotated by the endless conveyor, constituted by the links 45 and tubes 44. The endless conveyor is caused to move in substantially a horizontal plane by the plates 48 and 49, which prevent upward or downward movement of the links in engagement therewith.

For controlling the elevation of the shaping elements 42, a cam track 62, shown in detail in Figures 5, 6 and 7, is provided. The cam track 62 is provided with openings 64 through which the hubs of the sprocket wheels 54 extend. The cam track is supported by bolts 65 that extend downwardly from the plate 9. The bolts 65 also support a plate 66 that extends between the inner surfaces of the endless conveyor for pressing the links of the endless conveyor laterally into engagement with the plates 48 and 49. The outer surface of the cam track 62 is constituted by a substantially straight portion 67 disposed inwardly of the machine and below the gear 61, end portions 68 of slightly higher elevation than the portion 67, a sharply inclined portion 69, a lower portion 70 and an inclined portion 71. Bracing webs 72 extend longitudinally of the cam track and cooperate with sleeves 74, through which the bolts 65 extend. Heads on the shaping elements 42 move along the surface of the cam track 62 in a counter clockwise direction and are lowered or raised in accordance with their position therealong for lowering them into shaping relation with the shaping elements 21 or for withdrawing them therefrom.

Referring to Figure 4, each shaping element 42 is shown in the form of a male die 75 that seats in the shaping element 21. The die 75 has a threaded connection with a rod 76 that extends upwardly through a sleeve 77 and terminates in a head 76a. The sleeve 77 is adapted for longitudinal movement through the tube 44 constituting a pintle for the endless conveyor. The sleeve 77 is provided with a head 78 that moves along the surface of the cam track 62. Accordingly, when each head 78 is opposite the lower portion 70 of the cam track, the shaping element is depressed, and as the head moves along the inclined portion 71 it is elevated until the end portions 68 are reached.

The spacing and timed relation of the cam track 62 and the shaping elements 21 are such that as each head 78 slides down the inclined portion 69 of the cam track the shaping element 42 carried thereby engages a shaping element 21 carried by the table 20. During the movement of the head 78 along the low portions 70 of the cam track, the shaping elements are in position for working on material confined between the shaping elements. As each head 78 starts up the inclined portion 71, the shaping elements 21 continue in their circular path and the shaping elements 42 continue in the path of the endless conveyor.

Each shaping element 42 is provided with an outer housing 79 that engages a sloping surface 80 on a shaping element 21 for centering the shaping elements 21 and 42. A light spring 82 forces the housing 79 into engagement with the surface 80. A tubular member 84 is mounted on the shaping element 42 and is pressed by a heavy spring 85 into position to close the space between the shaping elements 21 and 42 for preventing the formation of fins during the shaping operation. Variations in the amount of material confined between the shaping elements 21 and 42 are compensated for by a longitudinal movement of the rod 76 and sleeve 77 inside the tubes 44, as more fully hereinafter described.

For firmly pressing the shaping elements 42 into engagement with the shaping elements 21, I provide a plurality of rollers 86 carried by a hub 87 keyed to a shaft 88. The end of the shaft 88 adjacent to the hub 87 is carried by a bearing 89 resiliently supported by a spring 90 carried on the plate 9. The other end of the shaft is journaled in a block 91 suspended by bolts 92 from the plate 9.

A vertically extending shaft 94 carried by the block 91 is provided with a pinion 95 that meshes with the gear 61 on the turret 7. The shaft 94 also carries a bevelled gear 96 that meshes with a bevelled gear 97 keyed to the shaft 88. Accordingly, as the turret 7 rotates, the shaft 88 is rotated for bringing successive rollers 86 into engagement with the heads 78 of successive shaping elements 42. By reason of the resilient mounting of the shaft 88, substantially the same pressure is always applied to the shaping elements 42. Differences in the amount of material confined between the shaping elements 42 and 21 are compensated for by a longitudinal movement of the shaping element 42 that slightly raises or lowers the end of the shaft 88. The shaft 88 swivels slightly about its bearings 98 in the block 91.

With the foregoing structure, the rotation of the turret 7 causes the shaping elements 21 to be successively opened, the articles therein discharged, and fresh material supplied thereto by the shearing mechanism 24. The charged shaping elements are then conveyed to a position where they are engaged by the shaping elements 42 that are lowered into engagement therewith by the movement of the sprocket wheels 54 actuating the endless conveyor.

After the shaping operation the shaping elements 42 are raised out of engagement with the shaping elements 21 and the latter continue to travel with the turret until they are opened and discharged.

It will be apparent to those skilled in the art that the machine illustrated herein is adaptable particularly for performing a pressing operation on glass articles of a wide variety of shapes and sizes. The construction of the endless conveyor and of the carriers for the upper shaping elements is such as to permit a stroke for shaping or forming purposes materially in excess of the stroke which has heretofore been considered feasible with a continuously operating machine. This feature is of especial advantage in the formation of tumblers and similar articles.

The provision of a continuously driven flexibly supported means cooperating with the carriers for the upper shaping elements contributes toward the results referred to. Inasmuch as the parts are all rotated or driven in synchronism, it will be apparent that one of the small rollers 86 is at all times in position to engage one of the heads 78 and insure positive depression thereof in timed relation to the other machine operations.

While I have shown and described the machines in connection with the shaping of glass articles, it is to be understood that other types of shaping devices or tools may be substituted for the shaping elements 42 and 21 without departing from the spirit of the invention, and that such uses are contemplated thereunder.

Referring to Figures 8 and 9, each of the links 45 comprises an open section 100 constituted by perforated and widened portions 101 and a section 102 having a connecting cylindrical wall 104 therein. The sections are both perforated for the reception of the tubes 44. Each section 102 is adapted to fit into the section 100 of the adjacent link, whereby the insertion of a tube 44 through the aligned openings constitutes a chain pintle. The upper and lower edges of the section 102 are provided with the flanges 46 and 47, respectively, for cooperation with the guide blocks 48 and 49, hereinbefore referred to.

While I have illustrated and described the present preferred embodiment of my invention, it is to be understood that various changes may be made therein without departing from the spirit of the invention and the scope of the appended claims.

I claim:

1. In a plastic shaping machine, a movable shaping element, a second shaping element movable in a path other than the path of the first-named shaping element, a projectable plunger for supporting one of said shaping elements and means for moving the shaping elements into cooperative relation, said moving means comprising continuously driven yieldable means periodically brought into effective relation with said plunger for moving it and for compensating for differences in the amount of material confined between the shaping elements.

2. In a machine, a carrier, and means for moving the carrier comprising a plurality of adjacent links having pintle receiving openings therein through which the carrier extends, the carrier being movable relatively to the links in a direction generally axially of the pintle receiving openings.

3. In a machine, a vertically movable carrier, and means for moving the carrier comprising a plurality of adjacent links having openings therein through which the carrier extends, the carrier being vertically movable relatively to said links.

4. In a machine, a vertically movable carrier, and means for moving the carrier comprising a plurality of horizontally movable interconnected links having pintle receiving openings therein, the axes of which extend substantially vertically, through which the carrier extends.

5. In a plastic shaping machine, a vertically movable carrier, and means for moving the carrier comprising a plurality of horizontally movable interconnected links having openings therein, the axes of which extent substantially vertically, through which the carrier extends, and means for moving the links.

6. In a plastic working machine, a plurality of shaping elements rotatable about a fixed axis, an endless conveyor moving in a plane substantially parallel to the plane of rotation of said shaping elements and in axial alinement therewith, a plurality of shaping elements carried by the endless conveyor and traversing a path other than the path of the first-named shaping elements, and means comprising a cam track for successively bringing the shaping elements supported by the endless conveyor into engagement with the first-named shaping elements.

7. In a plastic working machine, a plurality of shaping elements movable about a fixed axis, a second group of shaping elements for coöperative engagement therewith and movable in a different path, and means for bringing individual shaping elements normally movable in the different paths into engagement, said means comprising a floating shaft operable separately from said shaping elements and disposed transversely with respect to said fixed axis and having a roller carried thereby for imparting movement to one of the shaping elements.

8. In a plastic working machine, an endless conveyor, shaping elements carried thereby, a cam track for controlling the position of the shaping elements, and a shaft having a plurality of moving elements carried thereby for imparting movement to successive shaping elements.

9. In a plastic machine, a plurality of shaping elements movable in a definite path, an endless conveyor, a plurality of shaping elements carried by the endless conveyor movable laterally of the plane of the conveyor and traversing a path other than the path of the first-named shaping elements, and means comprising a cam track for successively bringing the shaping elements supported by the endless conveyor into engagement with the first-named shaping elements.

10. In a plastic shaping machine, shaping elements carried by a horizontally disposed rotating support, and co-operating shaping elements carried by an endless conveyor, said conveyor comprising a series of links and carriers for the second-named shaping elements constituting pintles for the links.

11. In a plastic shaping machine, shaping elements carried by a horizontally disposed rotating support, co-operating shaping elements carried by an endless conveyor, said conveyor comprising a series of links and carriers for the second-named shaping elements constituting pintles for the links, and means for moving the shaping elements relative to the carriers during the movement of the conveyor.

12. In a plastic shaping machine, a support for shaping elements comprising a plurality of spaced sprocket wheels, an endless conveyor in energy translating engagement with the sprocket wheels, said conveyor comprising a plurality of links and pintles, and laterally movable shaping elements carried by the conveyor at certain of the pintles.

13. In a plastic shaping machine, a horizontally disposed rotatable support, a plurality of shaping elements carried thereby, a flexible endless conveyor disposed above said member, a plurality of vertically movable shaping elements carried by said conveyor, and continuously driven yieldable means for selectively moving the last named shaping elements into engagement with the shaping elements on said support while compensating for different amounts of material confined between said elements.

14. In a plastic shaping machine, a horizontally disposed rotatable support, a plurality of shaped elements carried thereby, a flexible endless conveyor comprising a series of connected links disposed above said member, a plurality of vertically movable shaping elements carried by said links, and continuously driven yieldable means for selectively moving the last named shaping elements into engagement with the shaping elements on said support while compensating for different amounts of material confined between said elements.

15. In a shaping machine, a plurality of plungers, shaping elements carried thereby, means for moving and supporting said plungers, and means for applying pressure to said plungers comprising a yieldingly mounted shaft and a plurality of rollers carried by said shaft for actuating said plungers.

16. In a shaping machine, a plurality of plungers, shaping elements carried thereby, means for moving and supporting said plungers, and means for applying pressure to said plungers comprising a yieldingly mounted shaft and a plurality of rollers carried by said shaft for engaging and actuating said plungers.

17. Plunger actuating means for pressing machines, comprising a shaft, means for rotating said shaft, a plurality of separate individually operable pressing surfaces carried by said shaft and adapted to engage plungers, plungers adapted to be engaged by said pressing surfaces, and means for yieldingly supporting said surfaces.

18. Plunger actuating means for pressing machines, comprising a shaft, means for rotating said shaft, a plurality of pressing surfaces in the form of individual rollers carried by said shaft and adapted to engage the plungers to be actuated, and means for yieldingly supporting said rollers.

In testimony whereof I have hereunto set my hand.

EDWIN E. SLICK.